Dec. 8, 1936.   A. F. FORNELIUS ET AL   2,063,799

SPRING MOTOR

Filed April 20, 1935

WITNESSES
Edw. Thorpe
A.W. Foster

INVENTORS
Axel F. Fornelius
Henry A. G. Fornelius
BY
Munn, Anderson & Liddy
ATTORNEYS Patented Dec. 8, 1936

2,063,799

UNITED STATES PATENT OFFICE 2,063,799

SPRING MOTOR

Axel F. Fornelius and Henry A. G. Fornelius, Clifton, N. J.

Application April 20, 1935, Serial No. 17,509

1 Claim. (Cl. 185—37)

This invention relates to spring motors, an object of the invention being to provide a spring motor utilizing a normally wound ribbon in spiral form adapted when unwound to return to its wound position and backwind this spring from a rotary drum or pulley on to a driving pulley or drum of appreciably larger diameter than the first mentioned pulley so that the spring will turn the larger pulley with great power.

A further object is to provide a spring motor of this character which will operate for a greater length of time than is possible with spring motors such as heretofore devised and which is adapted for many uses such as, for example, a motor power for a clock, a phonograph, or for any other mechanism with which it is capable of use.

With these and other objects in view, the invention consists in certain novel features of construction and combinations and arrangements of parts, all of which will be more fully hereinafter described and pointed out in the claim.

Figure 1:
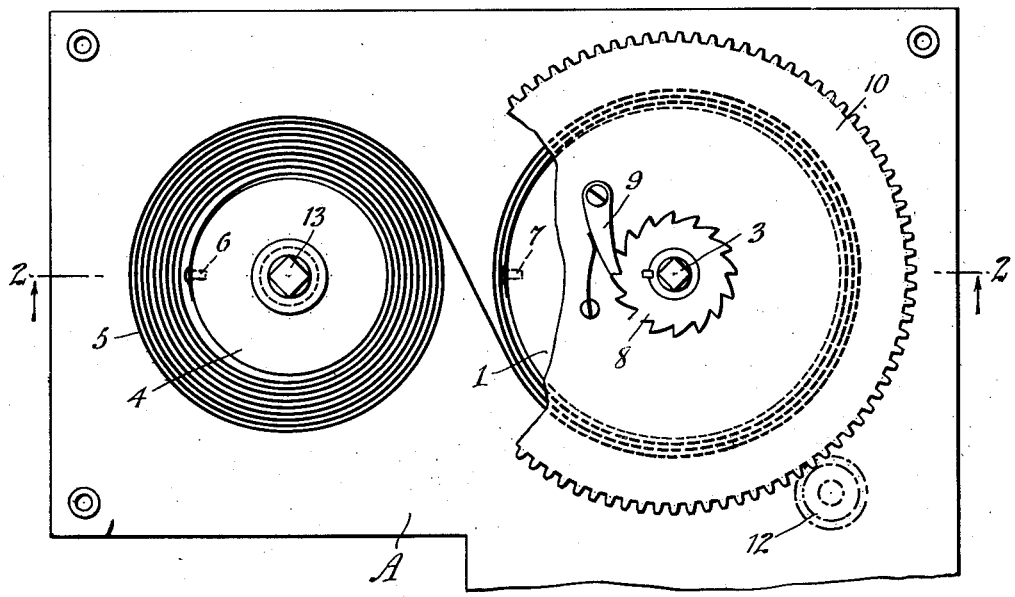
Fig. 1 is a broken plan view illustrating our invention.
Figure 2:
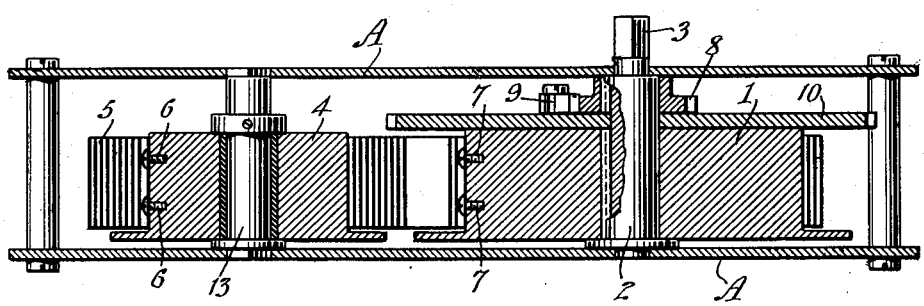
Fig. 2 is a view in longitudinal section on the line 2—2 of Fig. 1.

The reference character A is used to indicate a support of any suitable form. A driving pulley 1 is mounted on the support and fixed to turn with a shaft 2 which may be turned in any suitable manner. For illustration this shaft is shown as having a squared end 3 to receive a key or crank arm to turn the same. 4 represents a pulley which is smaller than the pulley 1 and we believe for practical purposes should be approximately one-half the diameter of the pulley 1. This pulley 4 is mounted to freely revolve on a shaft 13 mounted in support A and parallel to shaft 2.

On this pulley 4 is normally wound our improved spring 5, and this spring is of such character that it comprises a ribbon normally in equilibrium when wound in spiral form and adapted when unwound to return to its wound position. The inner end of this spring 4 is secured as, for example, by screws 6 to the periphery of pulley 4, and the opposite end of the spring is secured as, for example, by screws 7 to the pulley 1.

A ratchet wheel 8 may be fixed to the shaft 2 and engaged by a spring pressed pawl 9 carried by a gear wheel 10, and this gear wheel 10 is mounted to turn freely on the shaft 2 and is secured to turn with the shaft 2 in one direction by means of the ratchet wheel 8 and pawl 9, but is released in the opposite direction so that the pulley 1 may be turned in a direction to wind the spring thereon.

It will be noted particularly by reference to Fig. 1 of the drawing that the normally wound spring is so secured to the pulley 1 that when the pulley 1 is turned in a direction to wind the spring thereon it will backwind the spring. Thus the spring not only exerts the power of an ordinary spring in its tendency to straighten but it further exerts the power of its tendency to wind, and therefore the pulley 1 and the gear 10 have transmitted thereto a power at least double that of the ordinary spring, and hence the gear 10 will be turned with a maximum of power and for a length of time much greater than has been possible with spring motors heretofore.

The reference character 12 is employed to indicate a pinion which constitutes a driven member in mesh with the gear wheel 10, so that a relatively small movement of the gear wheel 10 will cause a complete rotary movement to the pinion 12, and from this pinion 12 power may be transmitted to operate any suitable mechanism.

With our improved spring motor the spring exerts a constant force regardless of how much or how little is wound upon the driving pulley, so that the force of the motor at the end of its operation is just as powerful as that at the beginning of the operation.

As above stated, the invention is not limited to the particular use to which this motor is put, and it is obvious that it has many uses, and various changes might be made in the general form and arrangement of parts without departing from the invention, and hence we do not limit ourselves to the precise details set forth but consider ourselves at liberty to make such changes and alterations as fairly fall within the spirit and scope of the claim.

We claim:

A spring motor comprising a support, a pair of shafts carried by the support, pulleys on said shafts, one of said pulleys being secured to turn with its shaft and the other free to turn on its shaft, a normally wound spring having one end secured to and being in equilibrium on the pulley which is free to turn, means securing its other end to the pulley which is keyed to its shaft in position for reverse flexing when the spring is backwound on said last mentioned pulley to drive the same, and a gear wheel having ratchet and pawl connection with the shaft to which the pulley is secured, said shaft being so constructed as to constitute a winding arbor.

AXEL F. FORNELIUS.
HENRY A. G. FORNELIUS.